United States Patent Office 2,791,571
Patented May 7, 1957

2,791,571

AQUEOUS INTERPOLYMER DISPERSIONS AND NON-BLOCKING FILMS THEREFROM

George L. Wheelock, Akron, and Gino P. Ferrini, Ravenna, Ohio, assignors to The B. F. Goodrich Company, New York, N. Y., a corporation of New York No Drawing. Application December 1, 1954, Serial No. 472,522

10 Claims. (Cl. 260—29.7)

This invention relates to aqueous dispersions of an interpolymer especially adapted to form strong, non-blocking polymer films and relates more particularly to an aqueous dispersion of an interpolymer of butadiene-1,3, a styrene and acrylonitrile each in particular proportions, and to films produced therefrom.

It is an object of this invention to provide an aqueous dispersion of an interpolymer especially adapted to form continuous interpolymer films which have high wet film strength. It is another object to provide an aqueous dispersion of an interpolymer which will dry at room temperature to form strong, oil-resistant, water-resistant, non-blocking interpolymer films. It is another object to provide an aqueous dispersion of an interpolymer particularly useful in leather treating, paper coating, in water-base paints, as a binder, and the like. It is another object to provide an interpolymer film having high wet strength and which is non-blocking and tough even when dried at room temperature. Other objects will be apparent from the description of the invention which follows.

The objects of this invention are accomplished, quite unexpectedly, by means of an aqueous dispersion of an interpolymer of a polymerized monomer mixture containing essentially 36±2 weight percent butadiene-1,3, 34±5 weight percent of a hereinafter-defined styrene and 30±3 weight percent acrylonitrile. More preferably the monomer mixture ratio is 36±1 weight percent of butadiene-1,3, 34±2 weight percent styrene and 30±2 weight percent acrylonitrile.

An aqueous dispersion of the defined interpolymer is used to deposit a continuous interpolymer film which has exceedingly high wet film strength and which will dry at room temperature. The resulting dry films have excellent tensile strength, low elongation, high modulus, high tear strength, oil-resistance, water-resistance, are non-blocking and tack-free. There are some resinous interpolymers which possess non-blocking characteristics but it is generally difficult to deposit a continuous film from aqueous dispersions of such resinous polymers; and there are elastomers which may be deposited from an aqueous dispersion to form continuous films at room temperature, but such films ordinarily are quite tacky. It is quite unexpected that one obtains the excellent balance of physical properties in both the wet and dry film from the hereinbefore-described critical monomer proportions.

The proportions of the monomers are quite critical. If more than about 38 weight percent of butadiene-1,3 is employed, the wet film strength is very poor, the tensile strength of the interpolymer falls off rapidly, the dry polymer film is tacky, has low modulus and high elongation. If less than about 34 weight percent butadiene-1,3 is employed in the monomer mixture, the aqueous dispersion of the interpolymer when deposited does not result in a continuous film, and that film which does form has poor low wet strength.

The ratio of butadiene-1,3 to the other two monomers is quite critical, and it is essential that it be about 36±2 weight percent to 64±2 weight percent of the other two monomers. To obtain the optimum balance of desirable properties, the ratio of styrene to acrylonitrile is also critical as is set forth below.

When more than about 33 weight percent acrylonitrile is employed in the monomer mixture, the film deposited from the latex is brittle and has decreased water resistance. If less than about 27 weight percent acrylonitrile is employed, the resulting dry film is tacky, has low tensile strength and less oil resistance than is desired.

When more than about 39 weight percent styrene is employed, tensile strength is decreased and tear strength is decreased. Although styrene is the preferred styrene monomer employed in the practice of the invention, alpha-substituted styrenes such as alpha-methyl styrene, nuclear-substituted styrenes such as vinyl toluene, and chlorostyrenes such as mono- and dichlorostyrenes may be employed with similar excellent results in the end interpolymer film product.

Films of the interpolymer of this invention are between about 0.0001 to 0.05 inch in thickness and more preferably from about 0.001 to 0.03 inch in thickness.

The aqueous dispersions of the invention are prepared by any of the methods known to those skilled in the art so long as a latex type material, which is defined as a colloidal water dispersion of a polymer material, is obtained. Polymerization in aqueous media is, of course, the conventional method for obtaining latices.

Aqueous polymerization systems may include substantial amounts of emulsifiers or may be essentially free of emulsifiers so long as a stable aqueous dispersion is obtained. The emulsifiers employed include ordinary fatty acid soaps such as sodium and potassium oleate, rosin acid soaps including hydrogenated rosin acid soaps and disproportionated rosin acid soaps, alkaryl sulfonates and similar synthetic saponaceous emulsifying agents. Further, the aqueous dispersions may be prepared in the presence of small amounts of emulsifying agents or in the essentially emulsifier-free systems disclosed in the co-pending application.

The catalyst system employed in polymerizing the monomer mixture to obtain the aqueous dispersions is not critical and may be any of those ordinarily employed by those skilled in the art. Catalyst systems which may be employed include the alkali persulfates, organic peroxides and well known redox systems including iron complexes, polyalkylene polyamines, ferrous gluconate and the like used in conjunction with organic peroxides and hydroperoxides.

The usual modifying agents for diene polymerization are ordinarily employed in the preparation of the interpolymer dispersions. Such materials include sulfur-containing materials as the alkyl mercaptans octaining 10 to 18 carbon atoms represented by dodecyl and t-dodecyl mercaptan, and diisopropyl xanthogen disulfide. The amount is not critical although it is preferred that about 0.1 to 1.0 weight part of modifier per 100 weight parts of monomers are employed. When properly modified, the interpolymer product has a Mooney value of about 50 to greater than 100 MS (small rotor) and preferably is between about 60 and 100 MS (small rotor) at 212–214° F.

The temperature of polymerization is preferably between about 5 and 50° C., although higher and lower temperatures may be employed if desired.

The polymerizations are preferably conducted to greater than about 90 percent conversion of monomers to polymer, and the usual shortstopping agents added to terminate the polymerization and destroy the catalyst and residual-free radicals remaining in the system. The latices are then preferably stripped of excess monomers and stabilized with the usual antioxidants such as phenyl beta-naphthylamine, although non-staining antioxidants which are essentially phenol derivatives are preferably employed.

It is desirable, of course, that the aqueous dispersion contain a high concentration of interpolymer. These are obtained most readily by polymerizing high proportions of monomers in relation to the amount of water used in the polymerization recipes. They are also obtained by concentrating polymerized latices by evaporation, creaming and subsequent separation of the water layer, and the like. Of course, for many operations, lower concentrations of interpolymer in dispersion are employed and these may be thickened if desired. The total solids concentration may be varied between about 30 and 65 percent, more preferably between about 35 and 45 percent.

Representative embodiments of the invention are set forth below and are intended to be illustrative only. All parts are parts by weight.

A useful polymerization recipe employed to prepare an aqueous dispersion of a butadiene-styrene-acrylonitrile monomer mixture is:

Material:                                         Parts
    Butadiene-1,3 _____  35.0
    Styrene _____  35.0
    Acrylonitrile _____  30.0
    Fatty acid soap _____   5.0
    Sodium sulfate _____   0.1
    Diisopropyl xanthogen disulfide _____   0.5
    Dimethyl amine _____   0.01
    Potassium persulfate _____   0.03
    Water _____ 170.0

This mixture is heated in a closed, stirred, autoclave at 35° C. for about 16 hours. A conversion of monomers to polymer of about 97 percent is obtained. The resulting latex is shortstopped with 0.1 part of butyl hydroquinone. The interpolymer latex is stripped with steam to remove the residual unpolymerized monomers and about 1.5 part of an antioxidant dispersion of a mixture of mono- and di-heptylated diphenylamine is added thereto. Portions of this latex are thickened with a 5 percent solution of sodium polyacrylate. Films are cast on a 14 x 14 inch glass plate with a 0.015 x 6 inch Bird applicator. Some of the films are allowed to air dry for 24 hours while others are heated in a 120° C. oven for 15 minutes. The films have the following physical properties:

|  | Air Dried | Oven Dried |
| --- | --- | --- |
| Tensile strength, p. s. i | 2,900 | 4,117 |
| Elongation, percent | 380 | 433 |
| 300% Modulus, p. s. i | 1,857 | 1,967 |
| Graves tear, pounds per inch | 383 | 455 |

Continuous films which have excellent wet film strength result when these latices are deposited on the glass plates. The dried films are tough, water-insensitive, non-tacky and have excellent tear strength.

For comparison purposes, a monomer mixture of 45 parts butadiene-1,3, 27.5 parts styrene and 27.5 parts acrylonitrile is polymerized in the same polymerization recipe. Films are deposited from the resulting dispersion having the following physical properties when dry:

|  | Air Dried | Oven Dried |
| --- | --- | --- |
| Tensile strength, p. s. i | 1,373 | 1,467 |
| Elongation, percent | 980 | 853 |
| 300% Modulus, p. s. i | 260 | 240 |
| Graves tear, pounds per inch | 87 | 90 |

The films laid down from this dispersion have poor wet strength, and the dry films have low tensile strength and modulus, high elongation, very poor tear resistance, are tacky and water-sensitive.

Another monomer mixture is polymerized in this same recipe, also for comparison purposes, consisting of 35 parts butadiene-1,3, 53 parts styrene and 12 parts acrylonitrile. Dry films laid down from this dispersion have the following physical properties:

|  | Air Dried | Oven Dried |
| --- | --- | --- |
| Tensile strength, p. s. i | 1,310 | 1,677 |
| Elongation, percent | 453 | 420 |
| 300% Modulus, p. s. i | 690 | 1,100 |
| Graves tear, pounds per inch | 167 | 267 |

The wet film in this case has poor strength, the dry film is water-sensitive, the modulus and tensile strength are low, and the tear strength is not as high as desired. Further, when an interpolymer dispersion is prepared from a monomer mixture of 30 parts butadiene-1,3, 40 parts styrene and 30 parts acrylonitrile, a continuous film is not obtained with room temperature drying.

When vinyl toluene or alpha-methyl styrene are substituted for styrene in the 35:35:30 monomer ratio, an aqueous dispersion is obtained which forms films which are equivalent to those obtained when styrene is used.

It is readily apparent from the above that the critical monomer proportions must be employed in order to obtain a film with the desired balance of physical properties, that is, a continuous film having excellent wet film strength, which on drying even at room temperature results in a tough water-insensitive film having high tear strength, is non-blocking and tack-free. Any variation from the herein-set forth critical proportions results in films with less than the desired properties for uses in paper coating, leather finishing, water-base paints and the like.

A typical paper application involves coating standard paper stock with a thickened dispersion of an interpolymer (A) made from a monomer mixture containing 35 weight percent butadiene-1,3, 35 weight percent styrene and 30 weight percent acrylonitrile prepared as described above by polymerization in a fatty acid soap recipe. The polymerization reaction is stopped when the monomers have reached a conversion of greater than 90 percent with a small amount of a shortstop. The resulting latex is stripped with steam and concentrated in a disc concentrator to a total solids content of about 40 percent. This dispersion contains less than about 0.5 percent free styrene. About one part of a non-staining antioxidant in the form of a dispersion is added to the latex. The latex is thickened with a small amount of a 5 percent solution of sodium polyacrylate in water and coated on the standard paper stock to a depth of about 0.003 inch wet coat. The coated paper is dried and the resulting material has a single dry coat of the described interpolymer about 0.001 inch thick. Similar paper stock is treated with an interpolymer dispersion (B) made from a monomer mixture containing 45 weight percent butadiene-1,3, 27.5 weight percent styrene and 27.5 weight percent acrylonitrile, and with an interpolymer dispersion (C) made from a monomer mixture containing 40 weight percent butadiene-1,3, 30 weight percent styrene and 30 weight percent acrylonitrile. Physical properties of the coated paper stocks are given below:

| Polymer | A | B | C |
|---|---|---|---|
| Percent pick-up | 62.1 | 64.5 | 61.3 |
| Tensile strength (Pounds/inch): | | | |
| Dry | 25.9 | 26.6 | 32.0 |
| Wet | 12.2 | 5.6 | 4.5 |
| Burst strength (p. s. i.): | | | |
| Dry | 65.0 | 50.0 | 38.0 |
| Wet | 19.0 | 10.5 | 8.5 |
| Tear (gm./0.001 inch): | | | |
| Dry | 10.8 | 10.8 | |
| Wet | 14.3 | 10.8 | |
| Heat aging—212° F.—Reflectometer-brightness: | | | |
| Hours— | | | |
| 0 | 78 | 78 | 79 |
| 6 | 64 | 55 | 65 |
| 24 | 52 | 40 | 46 |
| 48 | 44 | 35 | 39 |
| Fadometer: | | | |
| Hours— | | | |
| 0 | 78 | 78 | 79 |
| 10 | 75 | 67 | 71 |
| 20 | 66 | 60 | 58 |
| 30 | 55 | 47 | |
| Surface tack | None | Poor | Poor |
| Grease proofness | Excellent | Fair | Fair |
| Water proofness | No penetration | Penetration | Penetration |

The interpolymer film of this invention represented by A is quite superior when applied to paper to a similar interpolymer made with monomer mixtures of proportions outside the critical range of this invention. This is evidenced strikingly by absence of surface tack, excellent grease proofness and no penetration of the coated paper by water. In contrast materials B and C have surface tack, being quite tacky, only fair grease proofness and are readily penetrated by water. Further, the aging properties of the film A on paper are quite superior to those of the comparison polymers, both as to heat and light. These advantages are gained without the loss of any other important physical properties as is evidenced by the other physical properties of the table.

The aqueous dispersions of the invention are further quite valuable, and unexpectedly so, because of the lack of tack, when used as adhesives for fibrous materials. This is very important when fibrous materials are treated or mixed with such dispersions, dried and molded under heat and pressure since materials outside the critical monomer ranges of this invention form compositions which are quite tacky and sticky at elevated temperatures, while the materials of this invention are tack-free and non-blocking and are excellent adhesives.

Although representatives embodiments of the invention have been specifically described, it is not intended nor desired that the invention be limited solely thereto as it will be apparent to those skilled in the art that modifications and variations may be made without departing from the spirit and scope of the invention as defined in the appended claims.

We claim:

1. An aqueous dispersion of an interpolymer especially adapted to form strong non-blocking polymer films, said interpolymer prepared by polymerizing a monomer mixture consisting essentially of about 35 weight percent butadiene-1,3, about 35 weight percent styrene and about 30 weight percent acrylonitrile.

2. An interpolymer of a monomer mixture consisting essentially of about 35 weight percent butadiene-1,3, about 35 weight percent styrene and about 30 weight percent acrylonitrile.

3. An interpolymer film characterized by being non-blocking and tack-free, having a thickness less than about 0.05 inch and consisting essentially of the polymerization product of a monomer mixture of about 35 weight percent butadiene-1,3, about 35 weight percent styrene and about 30 weight percent acrylonitrile.

4. An aqueous dispersion of an interpolymer especially adapted to form strong non-blocking polymer films, said interpolymer prepared by polymerizing a monomer mixture comprising from about 34 to 38 weight percent butadiene-1,3, about 29 to 39 weight percent of a monomer selected from the class consisting of styrene and alpha- and nuclear-substituted alkyl and chloro-styrenes and about 27 to 33 weight percent acrylonitrile.

5. An aqueous dispersion of an interpolymer especially adapted to form strong non-blocking polymer films, said interpolymer prepared by polymerizing a monomer mixture comprising from 34 to 38 weight percent butadiene-1,3, 29 to 39 weight percent styrene and 27 to 33 weight percent acrylonitrile.

6. An aqueous dispersion of an interpolymer especially adapted to form strong non-blocking polymer films, said interpolymer prepared by polymerizing a monomer mixture consisting essentially of 35 to 37 weight percent butadiene-1,3, 32 to 36 weight percent styrene and 28 to 32 weight percent acrylonitrile.

7. An aqueous dispersion of an interpolymer especially adapted to form strong non-blocking polymer films, said interpolymer prepared by polymerizing a monomer mixture consisting essentially of 35 to 37 weight percent butadiene-1,3, 32 to 36 weight percent of a monomer selected from the class consisting of styrene and alpha- and nuclear-substituted alkyl and chloro-styrenes and 28 to 32 weight percent acrylonitrile.

8. An interpolymer of a monomer mixture comprising from about 34 to 38 weight percent butadiene-1,3, about 29 to 39 weight percent of a monomer selected from the class consisting of styrene and alpha- and nuclear-substituted alkyl and chloro-styrenes and about 27 to 33 weight percent acrylonitrile.

9. A film of an interpolymer of a polymerized monomer mixture comprising from about 34 to 38 weight percent butadiene-1,3, about 29 to 39 weight percent of a monomer selected from the class consisting of styrene and alpha- and nuclear-substituted alkyl and chloro-styrenes and about 27 to 33 weight percent acrylonitrile.

10. An article comprising a structure having thereon a coating comprising a layer of an interpolymer of a monomer mixture comprising from about 34 to 38 weight percent butadiene-1,3, about 29 to 39 weight percent of a monomer selected from the class consisting of a styrene and alpha- and nuclear-substituted alkyl and chloro-styrenes and about 27 to 33 weight percent acrylonitrile.

References Cited in the file of this patent

UNITED STATES PATENTS

| | | |
|---|---|---|
| 2,384,543 | Fryling | Sept. 11, 1943 |
| 2,527,162 | Vanderbilt et al. | Oct. 24, 1950 |

UNITED STATES PATENT OFFICE
CERTIFICATE OF CORRECTION

Patent No. 2,791,571                                  May 7, 1957

George L. Wheelock et al.

It is hereby certified that error appears in the printed specification of the above numbered patent requiring correction and that the said Letters Patent should read as corrected below.

Column 2, line 58, for "octaining" read -- containing --; column 5, line 50, for "representatives" read -- representative --.

Signed and sealed this 22nd day of October 1957.

(SEAL)
Attest:

KARL H. AXLINE
Attesting Officer

ROBERT C. WATSON
Commissioner of Patents